United States Patent Office 3,789,020
Patented Jan. 29, 1974

3,789,020
METHOD FOR PREPARATION OF CATALYSTS
James L. Carter, Chatham, and John H. Sinfelt, Berkeley Heights, N.J., assignors to Esso Research and Engineering Company
No Drawing. Filed Feb. 1, 1971, Ser. No. 111,695
Int. Cl. B01j 11/08, 11/22
U.S. Cl. 252—442                            20 Claims

ABSTRACT OF THE DISCLOSURE

A method for the preparation of a catalyst comprising two or more metals in low concentration and one or more nonmetallic refractory materials in high concentration, which comprises supporting the metals on a fraction of the nonmetallic refractory material, and mixing said fraction with the remaining nonmetallic refractory material, whereby the overall catalyst at reaction conditions consists of a physical mixture of the supported metallic component and the remaining nonmetallic refractory material. More particularly, the supported metallic component is treated under reducing conditions to form an alloy of the metals on said fraction of the nonmetallic refractory material. In preferred embodiments the supported metallic component of the catalyst comprises two metals, one from Group VIII and one from Group I–B, or both from Group VIII.

BACKGROUND OF THE INVENTION

Filed of the invention

A method for the preparation of a catalyst comprising two or more metals in low concentration and one or more nonmetallic refractory materials in high concentration, which comprises supporting the metals on a fraction of the nonmetallic refractory material, and mixing said fraction with the remaining nonmetallic refractory material, whereby the overall catalyst at reaction conditions consists of a physical mixture of the supported metallic component and the remaining nonmetallic refractory material. More particularly, the supported metallic component is treated under reducing conditions to form an aloy of the metals on said fraction of the nonmetallic refractory material. In preferred embodiments the supported metallic component of the catalyst comprises two metals, one from Group VIII and one from Group I–B, or both from Group VIII.

The prior art

Supported bimetallic catalysts for reforming, isomerization, and related processes are known in the art, and have been reported to possess certain advantages when the metals are present as an alloy. In U.S. 3,415,737, for example, a Pt-Re on alumina system is described in which it is believed by the inventor that the Pt and Re have formed an alloy and thus enhanced reforming properties of the catalyst. General procedures for preparing the catalyst are described, but the inventor does not discuss procedures which would maximize alloy formation.

It is also known in the art that in a bifunctional catalyst wherein a nonmetallic refractory material provides acidic sites which in conjunction with a metal component catalyze isomerization and hydrocracking reactions, the physical separation of the metal from most of the acidic sites, whereby the metal is supported on a small fraction of the total nonmetallic refractory material, minimizes harmful interaction between the two types of sites and can lead to much improved catalytic activity. This procedure is described in U.S. Pat. No. 3,346,510 relating primarily to systems comprising platinum and nonmetallic refractory materials such as alumina, silica, and aluminosilicates.

Summary of the invention

It has now been unexpectedly discovered that improved catalysts comprising two or more metals in low concentration and one or more nonmetallic refractory materials in high concentration are obtained when the metals are supported on a fraction of the nonmetallic refractory material, such that the overall catalyst at reaction conditions consists of a physical mixture of the supported metallic component and the remaining nonmetallic refractory material.

This method is especially effective where the concentration of the metal is small in relationship to the nonmetallic refractory material. Utilization of this method improves the degree of interaction of the metal components with each other during the catalyst preparation and thus the formation of alloys is enhanced. Another advantage, in the case where the nonmetallic refractory material supplies active sites to help catalyze the desired reaction, is that a portion of said refractory material is not subject to being inactivated by the metals.

The catalysts prepared by the method of the instant invention are especially valuable in petroleum processing. For example, reforming, isomerization, hydrogenation, and aromatization and hydrocracking catalysts can be prepared which have properties superior to catalysts prepared by the prior art methods.

In the preparation of petroleum process catalysts, nonmetallic refractory materials are generally utilized as supports. They are selected from the group consisting of alumina, silica, silica-alumina, crystalline aluminosilicates or zeolites, and silica-magnesia. Preferably the support is alumina for reforming.

In the present invention the metal components are preferably supported on less than about ¼ of the total nonmetallic refractory materials via impregnation, and mixed with the remaining nonmetallic refractory material, the final catalyst consisting of a physical mixture of the supported metallic component with the remaining nonmetallic refractory material. More preferably, the metal components are supported on about 1/10 or less of the nonmetallic refractory material. The supported metallic component may be prepared by a variety of methods, such as coimpregnation with a solution of mixed salts of the metal components or coprecipitation from a solution of the desired metal salts. In the case of coimpregnation, the metal salts can be impregnated serially or simultaneously. Preferably, the metals are converted to alloys under the conditions used to reduce the supported materials to the metallic form. It will thus be apparent to the skilled artisan which conditions to use for various metal combinations. The resulting supported material is converted to the supported metallic form by reduction, e.g., in hydrogen at temperatures of from 500 to 1100° F., and pressures of from 14 to 10,000 p.s.i.

Thus, salts chosen for preparing the catalyst are those which can be reduced to their corresponding metals, e.g., the halides or acid halides, nitrates, etc. Salts and acids which contain the metallic component in the anion may also be used, i.e., chloroplatinic acid, chloroiridic acid, perrhenic acid, etc. In the final catalyst mixture it is not necessary that the nonmetallic refractory material used as a support for the metals be the same nonmetallic refractory material used as a separate component of the mixture. For example, the metals may be supported on silica and then mixed with alumina.

The catalysts prepared by the method of the instant invention generally contain less than 10% by weight metal and the remainder nonmetallic refractory material. Preferably the metals comprise less than 5% by weight of the nonmetallic refractory material, and most preferably comprise less than about 1%.

In certain processes the catalyst will contain components other than metals and nonmetallic refractory material. For example, a reforming catalyst can contain from 0.1% to about 2.0% by weight of halogen, especially fluorine and chlorine, on the nonmetallic refractory material. These components are added to enhance the acidity of the nonmetallic refractory material.

In general, the catalysts prepared by the method of the instant invention comprise no more than three metals and the associated nonmetallic refractory material. Preferably the catalyst is bimetallic.

The metals useful within the scope of the instant invention are generally selected from Groups VIII, VII–B, VI–B, and I–B of the Periodic Table of the Elements. Preferably at least one metal is selected from Group VIII of the Periodic Table of the Elements, and more preferably at least one metal is selected from the group consisting of Pt, Ir, Rh, Ru, Pd and Os. Most preferably one of the metals is Pt or Ir.

In a bimetallic system, the remaining metal is preferably selected from the Groups VIII, VII–B, VI–B and I–B of the Periodic Table of the Elements, and most preferably from the group consisting of Ir, Au, Cu, Rh, Ru and Re.

Specific nonlimiting examples of catalysts prepared by the method of the instant invention are Pt-Re-alumina, Pt-Ir-alumina, Pt-Rh-alumina, Ir-Au-alumina, Ir-Cu-alumina, Pt-Cu-alumina and Pt-Au-alumina.

The metals can be present in the catalyst in any ratio to each other, depending on the requirements of the reaction process which utilizes the catalyst. Specifically, in a reforming process the catalyst will comprise from about 0.1 to about 2.0 weight percent total metal and the remainder alumina plus halogen. Such a catalyst is useful for the catalytic reforming of a naphtha feedstream to produce high octane components for gasoline blending.

In general, the catalyst preparation method of the instant invention is applicable to preparing catalysts useful in any process which utilizes supported catalysts comprising two or more metals. The method of preparing these catalysts results in catalysts having improved properties.

The following are preferred embodiments of the preparation method and uses of the catalysts of the instant invention.

A catalyst comprising a mixture of 75–90 parts by weight of alumina and 10–25 parts by weight of an alumina-supported bimetallic component comprising 2–4 wt. percent of platinum and 0.5–4 wt. percent of copper is used for the reforming of a naphtha feedstream. The supported bimetallic component of the catalyst is prepared by co-impregnation of alumina with an aqueous solution of chloroplatinic acid and copper nitrate. The resulting material is dried at 220–250° F. and mixed with alumina in the proportions indicated. The mixture of alumina with the supported bimetallic component is formed into pellets or extrudates approximately 1/16 to 1/4 inch in diameter. The catalyst is charged to a reforming unit, and on exposure to hydrogen at 700–1100° F. the supported bimetallic component is reduced to give the supported metallic phase. A naphtha comprising 15–75% paraffins, 15–75% naphthenes and the remainder aromatics, and boiling in the temperature range of 120–400° F. is then reformed over the mixed catalyst system at 150–450 p.s.i.g., 750–975° F., with 2000–6000 standard cu. ft. per barrel of recycled hydrogen and a space velocity of 1–5 pounds per hour per pound of catalyst to give a C5+ reformate with a research octane number of 80 to 100.

Following are a number of specific examples illustrating the teachings of the instant invention.

Example 1.—Preparation of Pt-Cu-alumina catalysts

In this example two catalysts were prepared with the overall composition of 0.3 wt. percent Pt and 0.3 wt. percent Cu with the balance being alumina plus halogen. Catalyst A was prepared by the method of the instant invention and Catalyst B was prepared by a conventional impregnation technique.

Catalyst A was prepared by impregnating 5 grams of eta alumina with an aqueous solution containing chloroplatinic acid and copper nitrate in amounts calculated to give 0.15 gram of Pt and 0.15 gram of Cu. The resulting material was dried at 220° F. for 16 hours and then mixed intimately with 45 grams of eta alumina in a ball mill.

Catalyst B was prepared by impregnating 50 grams of eta alumina with 30 ml. of an aqueous solution containing sufficient chloroplatinic acid and copper nitrate to give 0.15 gram of Pt and 0.15 gram of Cu. The material was then dried at 220° F. for 16 hours. These catalysts were activated by reduction in hydrogen at the run conditions shown in Examples 2 and 3 prior to testing.

Example 2

The catalysts prepared in Example 1 were tested for the conversion of methylcyclopentane. It can be seen from Table I that Catalyst A, prepared by the method of the instant invention, has a higher activity for the conversion of methylcyclopentane than does Catalyst B.

TABLE I

Percent conversion of methylcyclopentane:

Catalyst A _____ 19.3
Catalyst B _____ 9.9

Note.—Temperature 850° F., Pressure 200 p.s.i.g. Hydrogen to hydrocarbon mole ratio=5/1. Space velocity= 30 w./hr./w.

Example 3

The catalysts prepared in Example 1 were tested for the reforming of a naphtha stream. Table II shows that Catalyst A, prepared by the method of the instant invention, produces a product with a much higher Research Octane number than the catalyst prepared by the conventional method. The feed was a Louisana naphtha with an approximate boiling range of 200–325° F., and contained 40–45% naphthenes, 40–45% paraffins, and the remainder aromatics.

TABLE II

Research octane number:

Catalyst A _____ 99
Catalyst B _____ 84

Note.—Temperature 940° F., Pressure 200 p.s.i.g. Hydrogen to hydrocarbon mole ratio=5/1. Space velocity=1.5 w./hr./w.

Example 4.—Preparation of a Pt-Re-Alumina Catalyst

In this example, two catalysts with the overall composition of 0.3 wt. percent Pt and 0.3 wt. percent Re, with the balance being alumina plus halogen, were prepared. Catalyst C was prepared by the method of the instant invention and Catalyst D was prepared by a conventional impregnation technique.

Catalyst C was prepared by impregnating 5 grams of eta alumina with an aqueous solution containing chloroplatinic and perrhenic acids in amounts required to give 0.15 gram of Pt and 0.15 gram of Re. This material was then dried at 220° F. for 16 hours and mixed intimately with 45 grams of eta alumina in a ball mill.

Catalyst D was prepared by impregnating 50 grams of eta alumina with 30 ml. of an aqueous solution of chloroplatinic and perrhenic acids using concentrations selected to give 0.15 gram of Pt and 0.15 gram of Re, and then drying at 220° F. for 16 hours.

These catalysts were activated by reduction in hydrogen at the run conditions shown in Example 5 prior to testing.

Example 5

The catalysts prepared in Example 4 were tested in a process for reforming n-heptane. The catalyst prepared by the method of the instant invention decreased conversion to the undesirable $C_1$ to $C_4$ products.

TABLE III.—COMPARISON OF PREPARATION PROCEDURES FOR PLATINUM-RHENIUM CATALYSTS FOR NORMAL HEPTANE REFORMING [1]

| | Catalyst C | Catalyst D |
|---|---|---|
| Selectivity, weight percent: | | |
| $C_1$-$C_4$ | 27.2 | 31.9 |
| $C_5$-$C_6$ | 13.4 | 15.6 |
| Iso $C_7$ | 39.2 | 33.0 |
| Benzene plus toluene | 20.2 | 19.5 |
| Percent conversion | 79.2 | 87.3 |

[1] Overall catalyst composition for all catalysts: 0.3% Pt, 0.3% Re, 99.4% $Al_2O_3$ plus halogen.
Run conditions:
Temperature=925° F., space velocity=20 w./hr./w.
Presssre=200 p.s.i.g. 5/1 mole rato, $H_2$/n=heptane.

What is claimed is:

1. A method for the preparation of a catalyst composition comprising two or more catalyst metals contained on a refractory material selected from the group consisting of alumina, silica, silica-alumina, crystalline aluminosilicates, silica-magnesia or mixtures thereof which comprises supporting a mixture of Group VIII metals or a mixture including at least one Group VIII metal and at least one metal selected from Group I-B or VII-B of the Periodic Table of the Elements on less than about ¼ of the total refractory material of the catalyst to form a supported component and thereafter admixing said supported component with the remaining refractory material.

2. The method of claim 1 wherein said refractory material is alumina.

3. The method of claim 1 wherein at least one of the catalyst metals is platinum.

4. The method of claim 1 wherein said metals are supported on less than about ⅒ of the total refractory material.

5. The method of claim 1 wherein the catalyst metals are present in amounts less than about 1 wt. percent, based on refractory material.

6. A method for the preparation of a catalyst composition comprising two or more catalyst metals contained on a refractory material selected from the roup consisting of alumina, silica, silica-alumina, crystalline aluminosilicates, silica-magnesia and mixtures thereof which comprises supporting a mixture of components of Group VIII metals or a mixture including at least one Group VIII metal component and at least one metal component selected from Group I-B or VII-B of the Periodic Table of the Elements on less than about ¼ of the total refractory material of the catalyst by contacting said refractory material with a solution of the said metal component selected from the group consisting of reducible salts of said metals and reducible acids of said metals, the metal being contained in the anion of said acid, under impregnating conditions to form a supported component and thereafter admixing said supported component with the remaining refractory material.

7. The method of claim 6 wherein said refractory material is alumina.

8. The method of claim 6 wherein at least one of the catalyst metals is paltinum.

9. The method of claim 6 wherein said metals are supported on less than about ⅒ of the total refractory material.

10. The method of claim 6 wherein the catalyst metals are present in amounts less than about 1 wt. percent, based on refractory material.

11. A catalyst composition comprising a physical mixture of a supported component and additional refractory material, said supported component comprising a mixture of Group VIII metals or a mixture including at least one Group VIII metal and at least one metal selected from Group I-B or VII-B of the Periodic Table of the Elements contained on a refractory material selected from the group consisting of alumina, silica, silica-alumina, crystalline aluminosilicates, silica-magnesia and mixtures thereof, the refractory material of said supported component comprising less than about ¼ of the total refractory material of said catalyst.

12. The composition of claim 11 wherein said refractory material is alumina.

13. The catalyst composition of claim 11 wherein said metals are supported on less than about ⅒ of the refractory material.

14. The catalyst composition of claim 11 wherein one of the catalyst metals is platinum.

15. The catalyst composition of claim 11 wherein the catalyst metals are present in amounts less than about 1.0 wt. percent, based on refractory material.

16. The catalyst composition of claim 11 wherein said catalyst contains from 0.1 to about 2.0 wt. percent halogen, based on refractory material.

17. The catalyst composition of claim 16 wherein said halogen is chlorine.

18. The catalyst composition of claim 12 wherein said catalyst metals are present in amounts less than about 1.0 wt. percent, based on refractory material.

19. The catalyst composition of claim 18 wherein said catalyst contains from 0.1 to about 2.0 wt. percent halogen, based on refractory material.

20. The catalyst composition of claim 19 wherein said halogen is chlorine.

References Cited

UNITED STATES PATENTS

| | | | |
|---|---|---|---|
| 2,384,501 | 9/1945 | Streicher | 252—477 Q |
| 2,802,794 | 8/1957 | Sprauer | 252—466 PT |
| 2,890,178 | 6/1959 | Thorn et al. | 252—466 PT |
| 2,897,137 | 7/1959 | Schwarzenbek | 252—466 PT |
| 2,555,210 | 5/1951 | Waddill | 48—214 |
| 2,423,835 | 7/1947 | Houdry | 260—680 |
| 2,423,907 | 7/1947 | Schulze | 196—52 |
| 3,415,737 | 12/1968 | Kluksdahl | 208—139 |
| 3,346,510 | 10/1967 | Sinfelt | 252—455 |

DANIEL E. WYMAN, Primary Examiner

W. J. SHINE, Assistant Examiner

U.S. Cl. X.R.

252—460, 466 PT, 455 R